(12) United States Patent
Chen et al.

(10) Patent No.: US 11,043,804 B2
(45) Date of Patent: Jun. 22, 2021

(54) OVER-CURRENT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD

( * ) Notice: Subject to any disclaimer, the term of this patent is extended or adjusted under 35 U.S.C. 154(b) by 66 days.

(21) Appl. No.: 16/510,156

(22) Filed: Jul. 12, 2019

(65) Prior Publication Data

US 2021/0013711 A1      Jan. 14, 2021

(51) Int. Cl.
*H02H 9/02* (2006.01)
*H02H 3/08* (2006.01)
*H01C 7/02* (2006.01)

(52) U.S. Cl.
CPC ............. *H02H 9/026* (2013.01); *H01C 7/02* (2013.01); *H02H 3/085* (2013.01)

(58) Field of Classification Search
CPC .......... H02H 9/026; H02H 3/085; H01C 7/02
USPC ...................................................... 361/93.1
See application file for complete search history.

(56) References Cited

U.S. PATENT DOCUMENTS

| 5,776,371 A * | 7/1998 | Parker ................... | H01H 85/30 106/272 |
| 10,418,158 B1 * | 9/2019 | Chen ...................... | H01C 1/028 |

* cited by examiner

*Primary Examiner* — Dharti H Patel
(74) *Attorney, Agent, or Firm* — Grossman Tucker Perreault & Pfleger PLLC

(57) ABSTRACT

A over-current protection device includes a positive temperature coefficient (PTC) polymeric element having two opposite surfaces, two electrodes respectively connected to the surfaces of the PTC polymeric element, and a power-free trip indicator disposed on at least one of the electrodes for sensing temperature of the over-current protection device.

11 Claims, 4 Drawing Sheets

OVER-CURRENT PROTECTION DEVICE

FIELD

The disclosure relates to an over-current protection device, more particularly to an over-current protection device including a power-free trip indicator for sensing a surface temperature thereof.

BACKGROUND

A positive temperature coefficient (PTC) element exhibits a PTC effect that renders the same to be useful as a circuit protection device, such as a fuse.

Referring to FIG. 1, a conventional over-current protection device includes a PTC polymer material 8, and two electrodes 9 respectively connected to two opposite surfaces 81 of the PTC polymer material 8. The PTC polymer material 8 includes a polymer matrix that contains a crystalline region and a non-crystalline region, and a particulate conductive filler dispersed in the non-crystalline region of the polymer matrix and formed into a continuous conductive path for electrical conduction between the first and second electrodes 9. The PTC effect is referred to as a phenomenon that when the temperature of the polymer matrix is raised to its melting point, crystals in the crystalline region start to melt, which results in generation of a new non-crystalline region. As the new non-crystalline region increases to an extent that it merges into the original non-crystalline region, the conductive path of the particulate conductive filler will become discontinuous and the resistance of the PTC polymer material 8 will sharply increase, thereby resulting in electrical disconnection between the first and second electrodes 9. However, it is usually difficult to identify whether the PTC circuit protection device has been tripped or not, which results in imprecise determination of circuit failure.

Taiwanese Utility Model Patent Publication No. 424929 discloses an electrical fuse, which includes a casing, a filler that is filled in the casing and capable of expansion in response to rising temperature, conductive particles that are contained in the filler, two conductive sheets that are inserted into the casing, connected to the filler and spaced apart from each other at an appropriate interval, and a light-emitting diode (LED) that bridges the conductive sheets. The LED and the filler are in a parallel connection. In case of short circuit, the filler would expand because of the rising temperature, and the conductive particles in the filler would be separated from each other. Thus, the current would not travel through the filler but pass through the LED, causing the LED to emit light.

However, the above-mentioned configuration of the electrical fuse increases the complexity and cost of manufacturing thereof. Thus, there is a need for an over-current protection device which can be easily produced so as to meet industrial requirements.

SUMMARY

Therefore, an object of the disclosure is to provide an over-current protection device that can alleviate at least one of the drawbacks of the prior art.

According to the disclosure, the over-current protection device includes a positive temperature coefficient (PTC) polymeric element having two opposite surfaces, two electrodes respectively connected to the surfaces of the PTC polymeric element, and a power-free trip indicator disposed on at least one of the electrodes for sensing temperature of the over-current protection device.

BRIEF DESCRIPTION OF THE DRAWINGS

Other features and advantages of the disclosure will become apparent in the following detailed description of the embodiment(s) with reference to the accompanying drawings, of which

DETAILED DESCRIPTION

Figure 1:
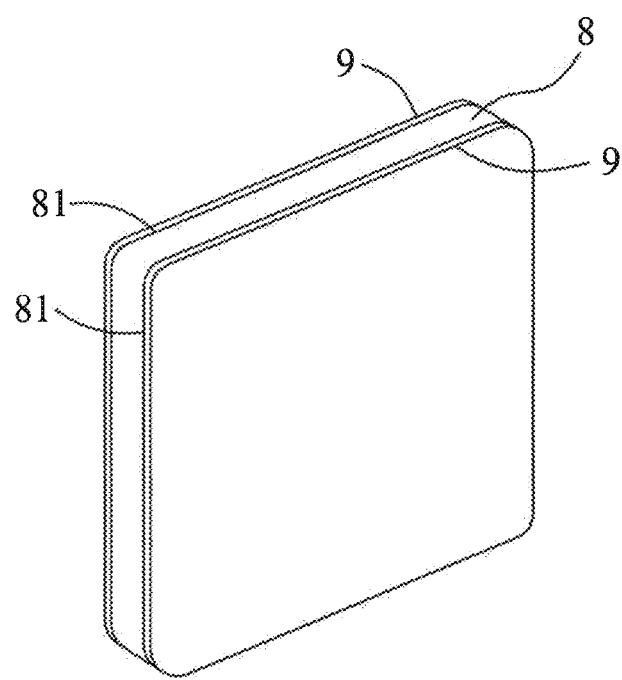
FIG. 1 is a perspective view of a conventional over-current protection device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
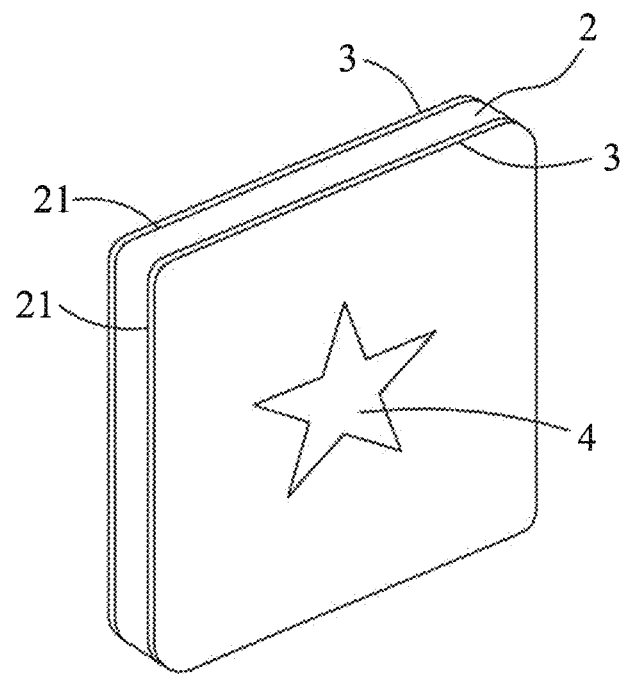
FIG. 2 is a perspective view of a first embodiment of an over-current protection device according to this disclosure in a normal (untripped) state.

Referring to FIG. 2, a first embodiment of an over-current protection device according to this disclosure includes a positive temperature coefficient (PTC) polymeric element 2 having two opposite surfaces 21, two electrodes 3 respectively connected to the surfaces 21 of the FTC polymeric element 2, and a power-free trip indicator 4 formed on at least one of the electrodes 3 for sensing temperature of the over-current protection device. In this embodiment, the power-free trip indicator 4 directly contacts the at least one of the electrodes 3.

The PTC polymer element 2 includes a polymer matrix and a particulate conductive filler dispersed in the polymer matrix. In certain embodiments, the polymer matrix is made from polyvinylidene fluoride (PVDF). In other embodiments, the polymer matrix is made from a polymer composition that contains a crystalline polyolefin selected from the group consisting of a non-grafted polyolefin (such as non-grafted high density polyethylene (HDPE), non-grafted low density polyethylene (LDPE), non-grafted ultra-low density polyethylene (ULDPE), non-grafted middle density polyethylene (MDPE), non-grafted polypropylene (PP)), a grafted polyolefin (such as carboxylic acid anhydride-grafted polyethylene) and combinations thereof, and a copolymer of an olefin monomer and an anhydride monomer (such as ethylene/maleic anhydride (PE/MA) copolymer and ethylene/butyl acrylate/maleic anhydride (PE/BA/MA) terpolymer).

The particulate conductive filler may be made from a material selected from the group consisting of carbon black, metal powder, ceramic powder, and combinations thereof. In certain embodiments, the particulate conductive filler is made from carbon black.

The power-free trip indicator 4 includes a thermochromic material, which may be commercially available from Chrome Life Technology Ltd. and New Prismatic Enterprise Co., Ltd, but is not limited thereto.

As used herein, the term "thermochromic material" generally refers to a substance that responds to changes in temperature by altering its ability to absorb, transmit or reflect light. Thus, the terms "thermochromic" and thermochromic-based changes in "color," as used herein, may refer to any visualizable change of the power-free trip indicator 4. Such visualizable change include changes in visible color proper, in fluorescence, in luminescence, phosphorescence, and the like phenomena, which may be indicated by development of the color or other visual phenomenon, elimination of the color or other visual phenomenon, or change from one to another color or other visual phenomenon. The change is one that is visualizable, i.e., any change that is apparent when the power-free trip indicator 4 is viewed by the human eye, either through or without a filter, and either with or without photostimulation, such as illumination by ambient light or exposure to light having a specific wavelength.

According to this disclosure, the thermochromic material may be dispersed throughout the power-free trip indicator 4, or localized in a zone or discrete zones of the power-free trip indicator 4. When localized, the zone(s) in which the thermochromic material is located, may be shaped or arranged in a desired geometric shape, figure or pattern.

In certain embodiments, the power-free trip indicator 4 exhibits a color-changing temperature. The color-changing temperature may be higher than 60° C. The color-changing temperature may be not greater than 200'C.

Figure 3:
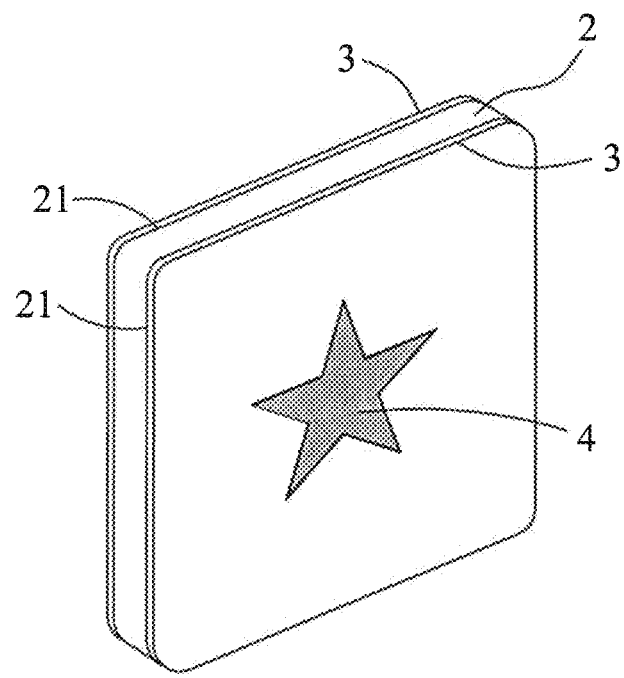
FIG. 3 is a perspective view of the first embodiment of the over-current protection device according to this disclosure in a tripped state.

According to this disclosure, the over-current protection device exhibits a trip surface temperature that is equal to or higher than the color-changing temperature of the power-free trip indicator 4. That is, the thermochromic material of the power-free trip indicator 4 may exhibit a color change in response to a tripped state (see FIG. 3). To be specific, in normal state, the surface temperature of the over-current protection device normally ranges between 25° C. and 50° C., which is below the color-changing temperature of the power-free trip indicator 4. However, when the over-current protection device is tripped, the surface temperature of the over-current protection device sharply increases to its trip surface temperature which exceeds the color-changing temperature of the power-free trip indicator 4. Thus, color change of the thermochromic material, of the power-free trip indicator 4 may be observed and is indicative of tripped state.

In certain embodiments, the trip surface temperature of the over-current protection device is higher than 70° C.

Figure 4:
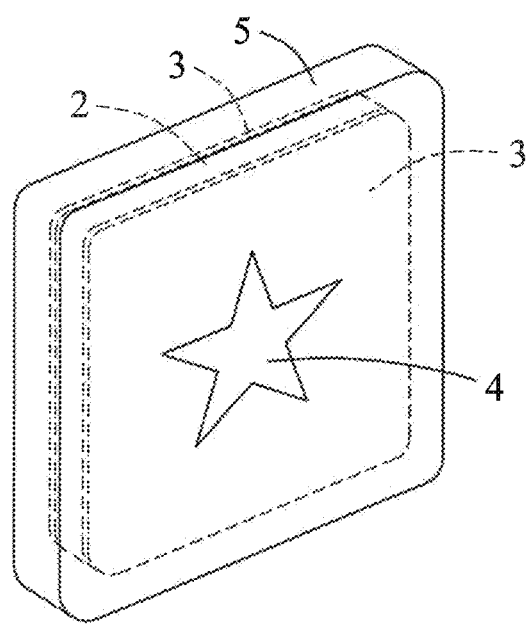
FIG. 4 is a perspective view of a second embodiment of the over-current protection device according to this disclosure.

Referring to FIG. 4, a second embodiment of the over-current protection device is similar to that of the first embodiment, except that the second embodiment further includes a cover layer 5 that is disposed between the power-free trip indicator 4 and the at least one of the electrodes 3. In this embodiment, the power-free trip indicator 4 indirectly contacts the at least one of the electrodes 3 through the cover layer 5. Moreover, the cover layer 5 may enclose an assembly or the PTC polymeric element 2 and the electrodes 3.

The cover layer 5 may be made from a thermally conductive and electrically insulating material. Examples of the thermally conductive and electrically insulating material may include, but are not limited to, solder mask, tape, epoxy resin, silicone resin, etc. The cover layer 5 may protect the PTC polymeric element 2 and the electrodes 3 from being damaged by an external force or environmental factors.

The disclosure will be further described by way of the following examples and comparative example. However, it should be understood that the following examples and comparative example are solely intended for the purpose of illustration and should not be construed as limiting the disclosure in practice.

EXAMPLES

Preparation of Polymer Blend Composition

Three polymer blend compositions (i.e. Formula-1, Formula-2 and Formula-3) used in the following examples were prepared using carbon black (CB) (serving as the particulate conductive filler, purchased from Columbian Chemicals Company, catalog no.: Raven 430UB, having a DBP/D of 0.95 and a bulk density of 0.53 g/cm3) and a polymer mixture as follows. To be specific, in Formula-1, the polymer mixture is ethylene/butyl acrylate/maleic anhydride terpolymer (PE/BA/MA) (purchased from Arkema Inc, trade name: Lotader® 3410, BA content: 18.0 wt %, MA content: 3.1 wt %, and melting point: 91° C.). In Formula-2, the polymer mixture includes HDPE (purchased from Formosa Plastics Corp., catalog no.: HDPE9002, melting point: 130° C.) serving as the non-grafted olefin-based polymer, and unsaturated carboxylic acid grafted polyolefin (i.e., maleic anhydride grafted-HDPE (MA-HDPE) (purchased from Dupont, catalog no.: MB100D, melting point: 134° C.) serving as the grafted olefin-based polymer. In Formula-3, the polymer mixture is polyvinylidene fluoride (PVDF, purchased from Arkema, catalog no.: Kynar® 761, melting point: 170° C.). The weight percentages of the polymer mixture and CB in each of the three polymer blend compositions are shown in Table 1.

The three polymer mixtures were separately compounded with the carbon black in a Brabender mixer at compounding temperature of 200° C., stirring rate of 30 rpm, and compounding time of 10 minutes, so as to obtain three polymer blend compositions (i.e., Formula-1, Formula-2 and Formula-3). Each of the polymer blend compositions was placed in a mold and then hot-pressed at 200° C. and 80 kg/cm2 for 4 minutes to form a sheet. The sheet was removed from the mold and placed between two nickel-plated copper foils. The combination of the sheet and the nickel-plated copper foils was then subjected to the hot-pressing treatment under the same conditions as mentioned above. The resultant thin plate having a thickness of 0.4 mm was cut into a plurality of chips, each of which has an area size of 64 mm$^2$. The chip made from each polymer blend composition was irradiated by a cobalt-60 gamma-ray that was generated by an irradiator with a total radiation dose of 150 kGy. The initial resistance of each of the chips at the temperature of 25° C. was measured using a micro-ohm meter. The average values of the initial resistance of the chips made from each of the polymer blend compositions and the volume resistivity thereof are shown in Table 1.

TABLE 1

| | Polymer blend composition | | | | | Chip (thickness = 0.4 mm) | |
|---|---|---|---|---|---|---|---|
| | Polymer mixture | | | | | Initial | Volume |
| Formula | PE/BA/MA (wt %) | HDPE (wt %) | MA-g-HDPE (wt %) | PVDF (wt %) | CB (wt %) | resistance (ohm) | resistivity (ohm · cm) |
| 1 | 42.0 | — | — | — | 58.0 | 0.016 | 0.205 |
| 2 | — | 21.0 | 21.0 | — | 58.0 | 0.020 | 0.256 |
| 3 | — | — | — | 60.0 | 40.0 | 0.050 | 0.640 |

Preparation of Over-Current Protection Device

Examples 1 (E1)

Two conductive metal pins were respectively connected to the copper foils of the chip made from the polymer blend composition of Formula-1, and then a cover layer made from epoxy resin was applied to enclose the resultant chips. A thermochromic material (purchased from Chroma Life Technology Ltd., catalog no.: H810Kb70P40, color-changing temperature (TCC): 70° C., displaying white color at a temperature lower than TCC and displaying blue color at a temperature higher than TCC) was screen-printed on the cover layer and then dried for about 2 minutes, so as to form a trip indicator on the over-current protection device of E1.

Examples 2 to 3 (E2-E3)

The procedures and conditions in preparing the over-current protection devices of E2 to E3 were similar to those of E1 except for the polymer blend compositions and the thermochromic materials used therein (see Table 2).

Examples 4 to 6 (E4-E6)

The procedures and conditions in preparing the over-current protection devices of E4 to E6 were similar to those of E1 to E3, respectively, except for the thermochromic materials used therein (see Table 2).

Comparative Examples 1 to 3 (CE1-CE3)

The procedures and conditions in preparing the over-current protection devices of CE1 to CE3 were similar to those of E1 to E3, respectively, except that the trip indicator of CE1 to CE3 was made from a non-thermochromic black marking ink (i.e., no color change with temperature).

Performance Tests

<Color Observation at Room Temperature>

The over-current protection devices of each of E1 to E6 and CE1 to CE3 were subjected to observation of the initial color of the trip indicator at 25° C. (untripped state). The results are shown in Table 3.

<Trip Test>

The over-current protection devices of each of E1 to E6 and CE1 to CE3 were subjected to a trip test, which was conducted under a fixed voltage of 16 Vdc and a fixed current of 10 A for 60 seconds. The trip surface temperature of the over-current protection device at a tripped point was measured by a thermocouple and the color of the trip indicator in a tripped state was observed. The results are shown in Table 3.

TABLE 3

| | | Trip test | |
|---|---|---|---|
| | Initial color of the trip indicator at 25° C. | Trip surface temperature (° C.) | Color of the trip indicator in a tripped state |
| E1 | White | 79.4 | Blue |
| E2 | White | 114.8 | Blue |
| E3 | White | 154.8 | Blue |
| E4 | White | 80.2 | Green |
| E5 | White | 115.3 | Green |
| E6 | White | 154.6 | Green |
| CE1 | Black | 80.1 | Black |
| CE2 | Black | 114.9 | Black |
| CE3 | Black | 155.3 | Black |

It can be seen from Table 3 that, as compared to CE1 to CE3, in which the trip indicator exhibited no color change in the tripped state, the trip indicators of the over-current protection devices of E1 to E6 displayed different colors in the tripped state (i.e., at a trip surface temperature that is

TABLE 2

| | Polymer blend composition Formula | (Thermochromic) material of the trip indicator | | | | |
|---|---|---|---|---|---|---|
| | | Brand | Cat. no. | TCC (° C.) | Color (lower than TCC) | Color (higher than TCC) |
| E1 | 1 | Chroma Life Technology Ltd. | H810Kb70P40 | 70 | White | Blue |
| E2 | 2 | | K810Kb110P40 | 110 | | |
| E3 | 3 | | H810Kb150P40 | 150 | | |
| E4 | 1 | New Prismatic Enterprise Co., Ltd. | TM-ISI 70-3529 | 70 | White | Green |
| E5 | 2 | | TM-ISI 110-3529 | 110 | | |
| E6 | 3 | | TM-ISI 150-3529 | 150 | | |
| CE1 | 1 | Markem-Imaje | 5751E-4 | N.A. | Black | Black |
| CE2 | 2 | | | | | |
| CE3 | 3 | | | | | | higher than TCC of the thermochromic material applied thereto) from the colors at the room temperature, thereby enabling a user to readily identify whether the devices has been tripped or not by naked eye (i.e., without the need of any other detection instruments).

In conclusion, with the inclusion of the temperature-responsive trip indicator, the tripped state of the over-current protection device of the present disclosure can be readily indentified through the color change of the trip indicator, and thus the overall cost and procedures of manufacturing the over-current protection device can be greatly reduced.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout, this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An over-current protection device comprising:
   a positive temperature coefficient (PTC) polymeric element having two opposite surfaces;
   two electrodes respectively connected to said surfaces of said PTC polymeric element;
   a power-free trip indicator formed on at least one of said electrodes for sensing temperature of said over-current protection device; and
   a cover layer disposed between said power-free trip indicator and said at least one of said electrodes, said cover layer enclosing an assembly of said PTC polymeric element and said electrodes, and being made from a thermally conductive and electrically insulating material.

2. The over-current protection device of claim 1, wherein said power-free trip indicator directly contacts said at least one of said electrodes.

3. The over-current protection device of claim 1, wherein said power-free trip indicator includes a thermochromic material.

4. The over-current protection device of claim 3, wherein said over-current protection device exhibits a trip surface temperature that is equal to or higher than a color-changing temperature of said power-free trip indicator.

5. The over-current protection device of claim 4, wherein said trip surface temperature of said over-current protection device is higher than 70° C.

6. The over-current protection device of claim 1, wherein said power-free trip indicator exhibits a color-changing temperature higher than 60° C.

7. The over-current protection device of claim 6, wherein said color-changing temperature of said power-free trip indicator is higher than 60° C. and not greater than 200° C.

8. The over-current protection device of claim 1, wherein said power-free trip indicator indirectly contacts said at least one of said electrodes through said cover layer.

9. The over-current protection device of claim 1, wherein said PTC polymeric element includes a polymer matrix and a particulate conductive filler dispersed in said polymer matrix.

10. The over-current protection device of claim 9, wherein said particulate conductive filler is made from a material selected from the group consisting of carbon black, metal powder, ceramic powder, and combinations thereof.

11. The over-current protection device of claim 10, wherein said particulate conductive filler is made from carbon black.

* * * * *